(12) United States Patent
Park et al.

(10) Patent No.: US 9,317,440 B2
(45) Date of Patent: Apr. 19, 2016

(54) COMPUTING DEVICE AND VIRTUAL DEVICE CONTROL METHOD FOR CONTROLLING VIRTUAL DEVICE BY COMPUTING SYSTEM

(71) Applicants: Young-Jin Park, Incheon (KR); Ilguy Jung, Hwaseong-si (KR); Donghyun Sohn, Hwaseong-si (KR)

(72) Inventors: Young-Jin Park, Incheon (KR); Ilguy Jung, Hwaseong-si (KR); Donghyun Sohn, Hwaseong-si (KR)

(73) Assignee: SAMSUNG ELECTRONICS CO., LTD., Samsung-ro, Yeontong-gu, Suwon-si, Gyeonggi-do (KR)

( * ) Notice: Subject to any disclaimer, the term of this patent is extended or adjusted under 35 U.S.C. 154(b) by 265 days.

(21) Appl. No.: 13/951,491

(22) Filed: Jul. 26, 2013

(65) Prior Publication Data

US 2014/0032874 A1 Jan. 30, 2014

(30) Foreign Application Priority Data

Jul. 26, 2012 (KR) .......................... 10-2012-0081553

(51) Int. Cl.
*G06F 12/00* (2006.01)
*G06F 12/10* (2006.01)
*G06F 12/06* (2006.01)
*G06F 12/02* (2006.01)
*G06F 9/455* (2006.01)

(52) U.S. Cl.
CPC ............ *G06F 12/1009* (2013.01); *G06F 9/455* (2013.01); *G06F 9/45533* (2013.01); *G06F 12/0238* (2013.01); *G06F 12/0246* (2013.01); *G06F 12/0638* (2013.01); *G06F 2009/45562* (2013.01); *G06F 2009/45583* (2013.01)

(58) Field of Classification Search
CPC ................ G06F 9/455; G06F 9/45533; G06F 2009/45562; G06F 2009/45583; G06F 12/0238; G06F 12/0638
See application file for complete search history.

(56) References Cited

U.S. PATENT DOCUMENTS

| | | | |
|---|---|---|---|
| 7,389,312 | B2 | 6/2008 | Ohran |
| 7,941,056 | B2 | 5/2011 | Baker et al. |
| 8,024,761 | B1 | 9/2011 | Giammarresi |
| 2011/0022642 | A1 | 1/2011 | deMilo et al. |
| 2012/0005274 | A1 | 1/2012 | Lee et al. |
| 2012/0311237 | A1* | 12/2012 | Park ..................... G06F 12/0246 711/103 |
| 2013/0024602 | A1* | 1/2013 | Sauber et al. ................. 711/103 |

FOREIGN PATENT DOCUMENTS

| | | |
|---|---|---|
| JP | 2009-157880 | 7/2008 |
| JP | 2011-154532 | 8/2011 |
| KR | 10-2008-0103777 A | 11/2008 |
| KR | 10-2011-0061342 A | 6/2011 |
| KR | 10-2011-0097434 A | 8/2011 |

* cited by examiner

*Primary Examiner* — Shawn X Gu
(74) *Attorney, Agent, or Firm* — Muir Patent Law, PLLC

(57) ABSTRACT

A virtual device control method of a computing device which includes a nonvolatile memory is provided. The virtual device control method includes receiving a virtualization request; assigning a first part of the nonvolatile memory to a virtual memory; assigning a second part of the nonvolatile memory to a virtual storage; and generating a virtual device including the assigned virtual memory and virtual storage.

19 Claims, 13 Drawing Sheets

COMPUTING DEVICE AND VIRTUAL DEVICE CONTROL METHOD FOR CONTROLLING VIRTUAL DEVICE BY COMPUTING SYSTEM

CROSS-REFERENCE TO RELATED APPLICATIONS

A claim for priority under 35 U.S.C. §119 is made to Korean Patent Application No. 10-2012-0081553 filed Jul. 26, 2012, in the Korean Intellectual Property Office, the entire contents of which are hereby incorporated by reference.

BACKGROUND

This disclosure relates to a computing device, and more particularly, a computing device and a virtual device control method of the computing device.

In recent years, a virtual device may have been applied to a computing device. The virtual device may be driven using a resource of the computing device. The computing device may drive a plurality of virtual devices which are different from one another. For example, a computing device may drive a first virtual device to drive a first operating system such as the Windows and a second virtual device to drive a second operating system such as the Linux.

In a computing device, a virtual device may be implemented by software. If a software error arises, however, the virtual device may experience a failure. In this case, data generated and managed by the virtual device may be lost. Also, the virtual device may have a slow operating speed in comparison with the computing device to drive the virtual device. Thus, a method capable of driving a virtual device with improved reliability and operating speed is desirable.

SUMMARY

One embodiment is directed to provide a virtual device control method of a computing device which includes a nonvolatile memory, the virtual device control method comprising receiving a virtualization request; assigning a first part of the nonvolatile memory to a virtual memory; assigning a second part of the nonvolatile memory to a virtual storage; and generating a virtual device including the assigned virtual memory and virtual storage.

In example embodiments, the nonvolatile memory is a magnetic RAM or a phase-change RAM.

In example embodiments, the virtual device control method further comprises assigning a third part of the nonvolatile memory to a virtual main memory of the computing device; assigning a fourth part of the nonvolatile memory to a virtual main storage of the computing device; and generating a virtual main device including the assigned virtual main memory and virtual main storage.

In example embodiments, generating, changing, and deleting of the virtual device is executed by a BIOS of the computing device.

In example embodiments, the virtual device control method further comprises generating a virtual memory address table including information on a mapping relationship between an address of the nonvolatile memory and an address of the virtual memory; and generating a virtual storage address table including information on a mapping relationship between an address of the nonvolatile memory and an address of the virtual storage.

In example embodiments, the virtual device control method further comprises receiving an access request and an address; converting an address of the virtual memory into an address of the nonvolatile memory based on the virtual memory address table when the access request and the address correspond to the virtual memory and an address of the virtual storage into an address of the nonvolatile memory based on the virtual storage address table when the access request and the address correspond to the virtual storage; and accessing the nonvolatile memory using the converted address.

In example embodiments, the virtual device control method further comprises detecting a failure of the virtual device; and generating a new virtual device including the virtual memory and the virtual storage to recover the failed virtual device.

In example embodiments, the virtual device control method further comprises accessing a virtual memory and a virtual storage of a nonvolatile memory in an external computing device; and generating a virtual device including the virtual memory and the virtual storage of the nonvolatile memory in the external computing device.

Another embodiments is directed to provide a computing device which comprises a processor; a nonvolatile memory; and a controller configured to control the nonvolatile memory according to a control of the processor, wherein the processor is configured to assign a virtual memory and a virtual storage on the nonvolatile memory via the controller and to generate and control a virtual device including the assigned virtual memory and virtual storage.

In example embodiments, the controller comprises a virtual memory controller configured to convert an address of the assigned virtual memory generated by the processor into an address of the nonvolatile memory; a virtual storage controller configured to convert an address of the assigned virtual storage generated by the processor into an address of the nonvolatile memory; and a generic memory controller configured to access the nonvolatile memory using an address converted by the virtual memory controller or the virtual storage controller.

In example embodiments, the controller is included in a North Bridge of the computing device.

In example embodiments, the computing device further comprises a random access memory configured to communicate with the processor via a North Bridge, the controller being included in a South Bridge of the computing device.

In example embodiments, the controller comprises a communication interface to communicate with an external computing device and the processor is configured to access a virtual memory and a virtual storage of the external computing device via the communication interface of the controller and to generate a virtual device including the virtual memory and the virtual storage of the external computing device.

In example embodiments, the nonvolatile memory is a magnetic RAM or a phase-change RAM.

In example embodiments, if a fail of the virtual device is detected, the processor is configured to generate a new virtual device including the virtual memory and the virtual storage.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
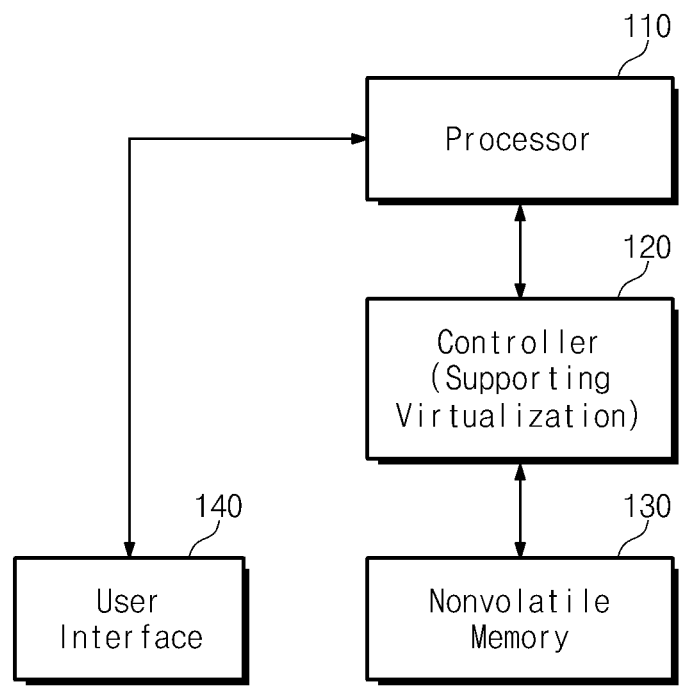
FIG. 1 is a block diagram schematically illustrating a computing device according to an exemplary embodiment.

Embodiments will be described in detail with reference to the accompanying drawings. The inventive concept, however, may be embodied in various different forms, and should not be construed as being limited only to the illustrated embodiments. Rather, these embodiments are provided as examples. Known processes, elements, and techniques are not described with respect to some of the embodiments described herein. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. Unless indicated otherwise, these terms are only used to distinguish one element, component, region, layer or section from another region, layer or section. Thus, a first element, component, region, layer or section discussed below could be termed a second element, component, region, layer or section without departing from the teachings disclosed herein.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, the terms "storage" and "memory," particularly when used in the context of "virtual storage" and "virtual memory," may be used as different meanings. The term "storage" may be used to indicate a storage medium of a computing device to store data in the long term (e.g., a hard disk drive, a solid state drive, etc.). The term "memory" may be used to indicate a storage medium of a computing device to store data in the short term and temporarily (e.g., a working memory, a cache memory, etc.). Stated differently, a "virtual storage" as described herein refers to a space for storing data to be retained after an execution or application process or program is completed, and a "virtual memory" as described herein refers to a space for storing data to be retained and/or used during an execution or application process or program, but which is no longer needed and/or may be discarded after the execution or application process or program is completed.

FIG. 1 is a block diagram schematically illustrating a computing device according to an exemplary embodiment. Referring to FIG. 1, a computing device according to one embodiment may comprise a processor 110, a controller 120, a nonvolatile memory 130, and a user interface 140.

The processor 110 may control an overall operation of the computing device 100, and may perform logical calculation. The processor 110 may include, for example, a general-purpose processor, an application processor, and so on.

The controller 120 may control the nonvolatile memory 130 according to a control of the processor 110. The controller 120 may control, for example, reading, writing, and erasing of the nonvolatile memory 130. The controller 120 may support virtualization.

The nonvolatile memory 130 may include nonvolatile random access memory such as a magnetic RAM (MRAM), a phase-change RAM (PRAM), and so on. In a typical virtual device, data intended for temporary storage is stored in a volatile memory (e.g., a DRAM), and data intended for long term storage is stored in a non-volatile memory (e.g., solid state drive or hard disk). In some cases, where the volatile memory becomes full, the data intended for temporary storage may then be stored in the non-volatile memory. However, this tends to slow down the system. Therefore, according to embodiments described herein, a non-volatile memory (e.g., MRAM, PRAM) having a fast speed can be used to store both temporary data and long-term data, without first storing or attempting to store the temporary data in a volatile memory.

The user interface 140 may include user input interfaces such as a keyboard, a mouse, a camera, a microphone, a touch pad, a touch screen, a sensor, and so on and user output interfaces such as a screen, a speaker, a ramp, a motor, and so on.

The processor 110 may assign a virtual image to the nonvolatile memory 130. The processor 110 may drive a virtual device in response to the virtual image assigned to the nonvolatile memory 130.

The controller 120 may control an access to the virtual image assigned to the nonvolatile memory 130.

Figure 2:
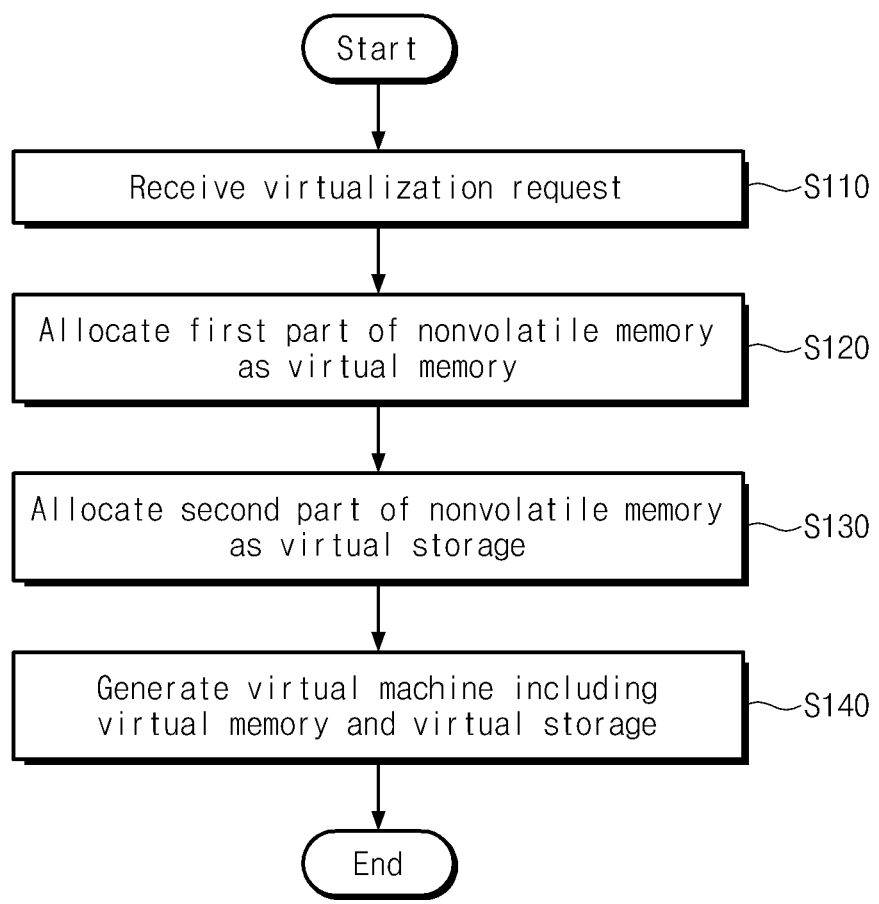
FIG. 2 is a flow chart illustrating an operating method of a computing device according to an exemplary embodiment.

FIG. 2 is a flow chart illustrating an operating method of a computing device according to an exemplary embodiment. A number of steps, also described as operations, are shown in FIG. 2. Referring to FIGS. 1 and 2, in operation S110, a virtualization request may be received. For example, a processor 110 may receive the virtualization request via a user interface 140. In one embodiment, the processor 110 may receive the virtualization request from an external device via communication.

In operation S120, a first part of a nonvolatile memory 130 may be assigned to a virtual memory. The processor 110 may assign the first part of the nonvolatile memory 130 to the virtual memory according to the virtualization request. A capacity of the virtual memory may be decided according to the virtualization request. When the virtual memory is assigned, a virtual address may be assigned to the virtual memory. When the virtual memory is assigned, there may be generated information indicative of a mapping relationship between the virtual address of the virtual memory and an actual address of the nonvolatile memory 130. The controller 120 may generate and manage the mapping information. In one embodiment, the mapping information may be managed using a table. For example, information on the mapping relationship of addresses of the virtual memory may be a virtual memory address table.

In operation S130, a second part of the nonvolatile memory 130 may be assigned to a virtual storage. The processor 110 may assign the second part of the nonvolatile memory 130 to the virtual storage according to the virtualization request. A capacity of the virtual storage may be decided according to the virtualization request. When the virtual storage is assigned, a virtual address may be assigned to the virtual storage. When the virtual storage is assigned, there may be generated information indicative of a mapping relationship between the virtual address of the virtual storage and an actual address of the nonvolatile memory 130. The controller 120 may generate and manage the mapping information. In one embodiment, the mapping information may be managed using a table. For example, information on the mapping relationship of addresses of the virtual storage may be a virtual memory address table.

In operation S140, a virtual device may be generated, the virtual device including the assigned virtual memory and virtual storage. The processor 110 may generate the virtual device by driving a process such as an operating system to drive the virtual memory and the virtual storage. The operating system of the virtual device may be selected, for example, according to the virtualization request or according to a separate request following the virtualization request.

In example embodiments, the virtual memory and the virtual storage may form a virtual image. The virtual image may further comprise an image of a process driven by the processor 110.

According to one exemplary embodiment, both the virtual memory and the virtual storage may be assigned to the nonvolatile memory 130. Random access memories such as MRAM and PRAM may have an operating speed faster than that of conventional storages such as a hard disk drive (HDD) and a solid state drive (SSD). Thus, in comparison with a conventional virtual device and a conventional virtual device control method, it is possible to improve an operating speed of a virtual device and a virtual device control method according to certain disclosed embodiments.

Nonvolatile memories such as MRAM and PRAM may retain data even at power-off. According to one embodiment, a virtual memory as well as a virtual storage may be assigned to the nonvolatile memory. Thus, the virtual device and the virtual device control method according to certain disclosed embodiment may secure a continuity of data stored at the virtual memory and the virtual storage, and may provide high reliability in comparison with a conventional virtual device and a conventional virtual device control method to assign a virtual memory to a volatile memory such as DRAM.

Figure 3:
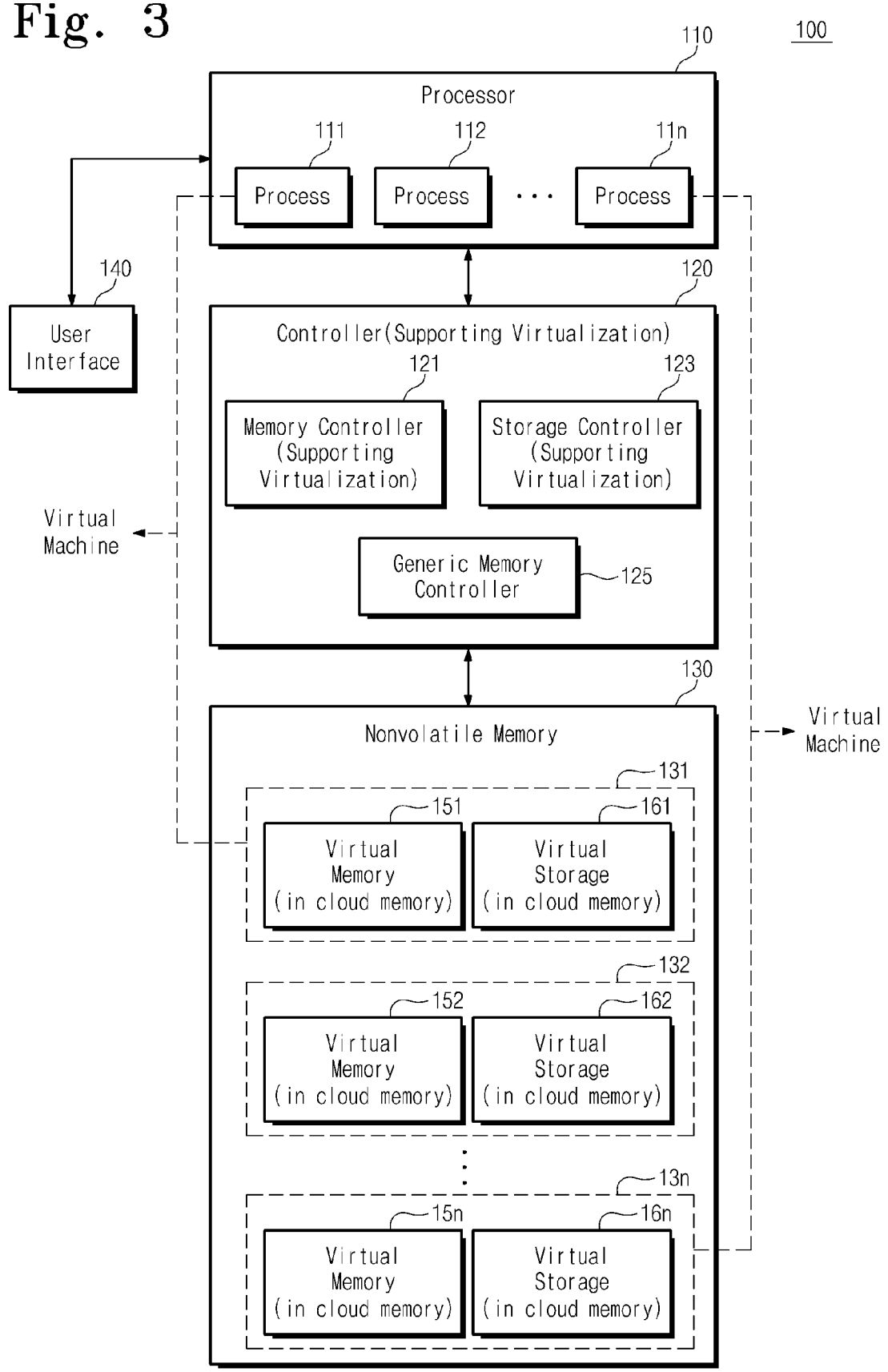
FIG. 3 is a diagram illustrating an example in which virtual devices are driven at a computing device of FIG. 1, according to an exemplary embodiment.

FIG. 3 is a diagram illustrating an example in which virtual devices are driven at a computing device of FIG. 1, according to one exemplary embodiment. Referring to FIG. 3, a plurality of virtual images 131 to 13$n$ may be assigned to a nonvolatile memory 130. Each of the virtual images 131 to 13$n$ may include a virtual memory 15$i$ (i=1~n) and a virtual storage 16$i$.

In example embodiments, the nonvolatile memory 130 may further comprise not only the nonvolatile memory 130 of the computing device 100 but also a nonvolatile memory of an external device connected with the computing device 10 via a network. For example, the nonvolatile memory 130 may be a cloud memory.

The processor 110 may drive a plurality of processes 111 to 11$n$ respectively corresponding to the virtual images 131 to 13$n$. Each of the processes 111 to 11$n$ may include an operating system or an operating system and an application program driven on the basis of the operating system. A process may form a virtual device with a virtual image.

A controller 120 may include a memory controller 121, a storage controller 123, and a generic memory controller 125.

The memory controller 121 may generate and manage table information on mapping relationship between virtual addresses of the virtual memories 151 to 15$n$ and addresses of the nonvolatile memory 130. The memory controller 121 may receive virtual addresses of the virtual memories 151 to 15n generated by the processes 111 to 11n to convert them into addresses of the nonvolatile memory 130. The storage controller 123 may generate and manage table information on mapping relationship between virtual addresses of the virtual storages 161 to 16n and addresses of the nonvolatile memory 130. The storage controller 123 may receive virtual address of the virtual storages 161 to 16n generated by the processes 111 to 11n to convert them into addresses of the nonvolatile memory 130.

The generic memory controller 125 may access the nonvolatile memory 130 based on address of the nonvolatile memory 130 converted by the memory controller 121 or the storage controller 123. As such, the controller 120 may include a first address conversion circuit configured to convert received virtual addresses of virtual memories 151 to 15n to actual addresses of nonvolatile memory 130, and a second address conversion circuit configured to convert received virtual addresses of virtual storages 161 to 16n to actual addresses of nonvolatile memory 130. In addition, controller 120 includes a generic memory controller, for example, for transmitting commands and data to the nonvolatile memory 130 based on actual addresses received from the first and second address conversion circuits.

In example embodiments, assignment of virtual devices to the whole storage capacity of the nonvolatile memory 130 may be performed by a logical unit. Nonvolatile memory 130 may include, for example, a plurality of memory chips and/or a plurality of memory modules. In the nonvolatile memory 130 including a plurality of memory chips, virtual devices may be assigned by a unit of one or more chips. For example, a single virtual device may be mapped to memory contained in a plurality of chips. In the nonvolatile memory 130 including a plurality of memory modules, virtual devices may be assigned by a unit of one or more modules.

Figure 4:
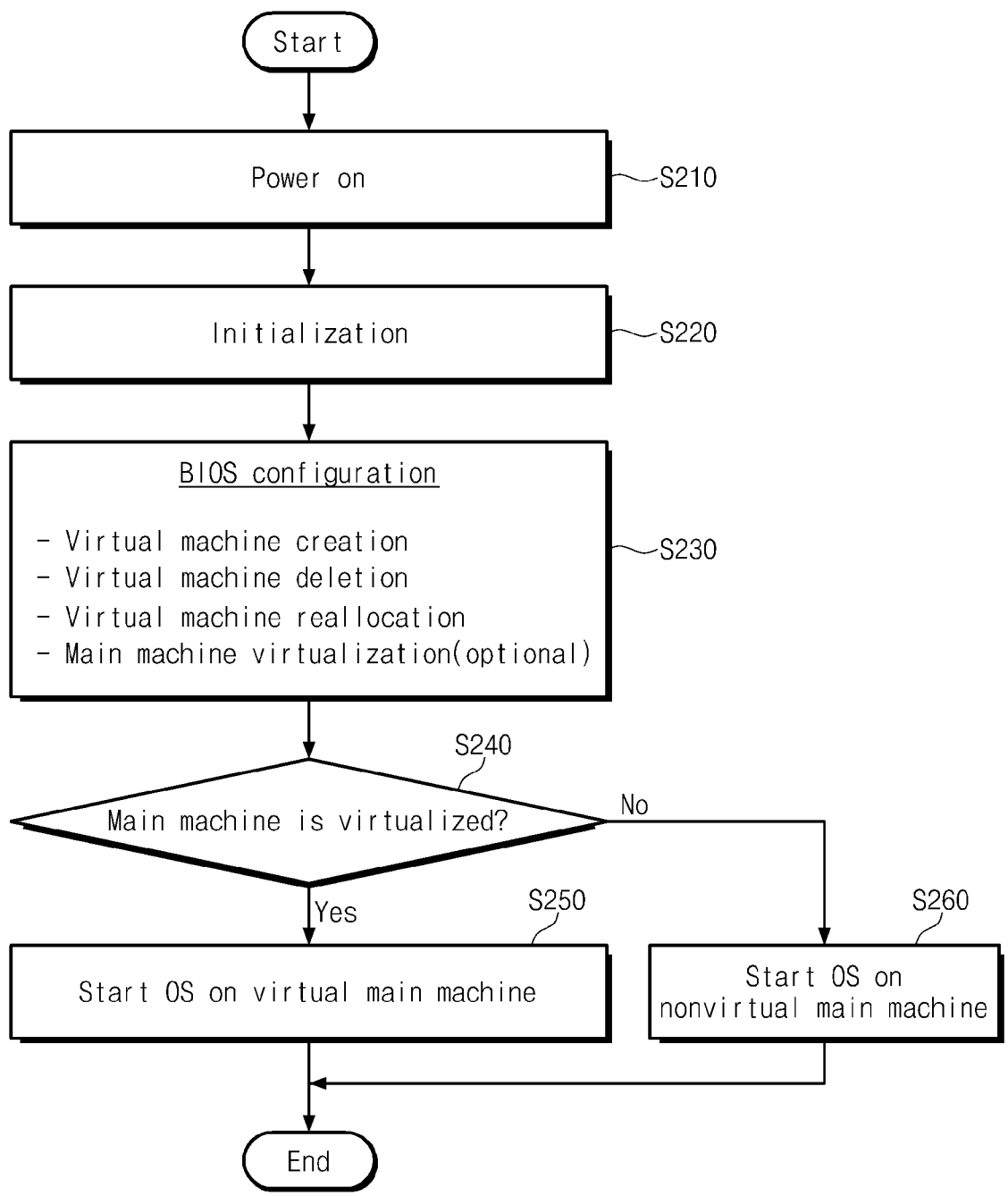
FIG. 4 is a flow chart illustrating an operating method of a computing device according to another exemplary embodiment.

FIG. 4 is a flow chart illustrating an operating method of a computing device according to another exemplary embodiment. A number of steps, also described as operations, are shown in FIG. 4. A booting method of a computing device is illustrated in FIG. 4. Referring to FIGS. 3 and 4, in operation S210, the computing device 100 may be powered on.

In operation S220, the computing device 100 may perform initialization. For example, the computing device 100 may perform power-on self-test (POST). The computing device 100 may initialize internal components.

In operation 230, Basic Input/output System (BIOS) configuration may be set. For example, generating of a virtual device, deleting of the virtual device, reassigning of the virtual device, virtualization of a main device, and so on may be performed.

The generating of the virtual device may include an operation of assigning a virtual image to a nonvolatile memory 130. The generating of the virtual device may further comprise an operation of selecting or installing a process to drive the assigned virtual image.

The deleting of the virtual device may include an operation of deleting the assigned virtual image. The deleting of the virtual device may further include an operation of ending or deleting a process to drive the deleted virtual image.

The reassigning of the virtual device may include changes of an address and a size of the assigned virtual image.

The virtualization of the main device may include an operation of virtualizing a main system to drive the computing device 100. For example, the virtualization of the main device may include operations of assigning a virtual main memory and a virtual main storage of a main system to drive the computing device to the nonvolatile memory 130 and selecting or deleting a main process to drive it. The virtualization of the main device may include an operation of selecting one of virtual devices installed at the computing device 100 as a main device. The main system may be a system executed at the computing device 100 when the computing device 100 is powered and separate setting or selecting of virtualization is not performed.

In operation S240, whether the main device is virtualized may be determined. In the case that the main device is virtualized, in operation S250, an operating system may be executed at the virtual main device. If the main device is not virtualized, in operation S260, an operating system may be executed at a non-virtual main device.

Figure 5:
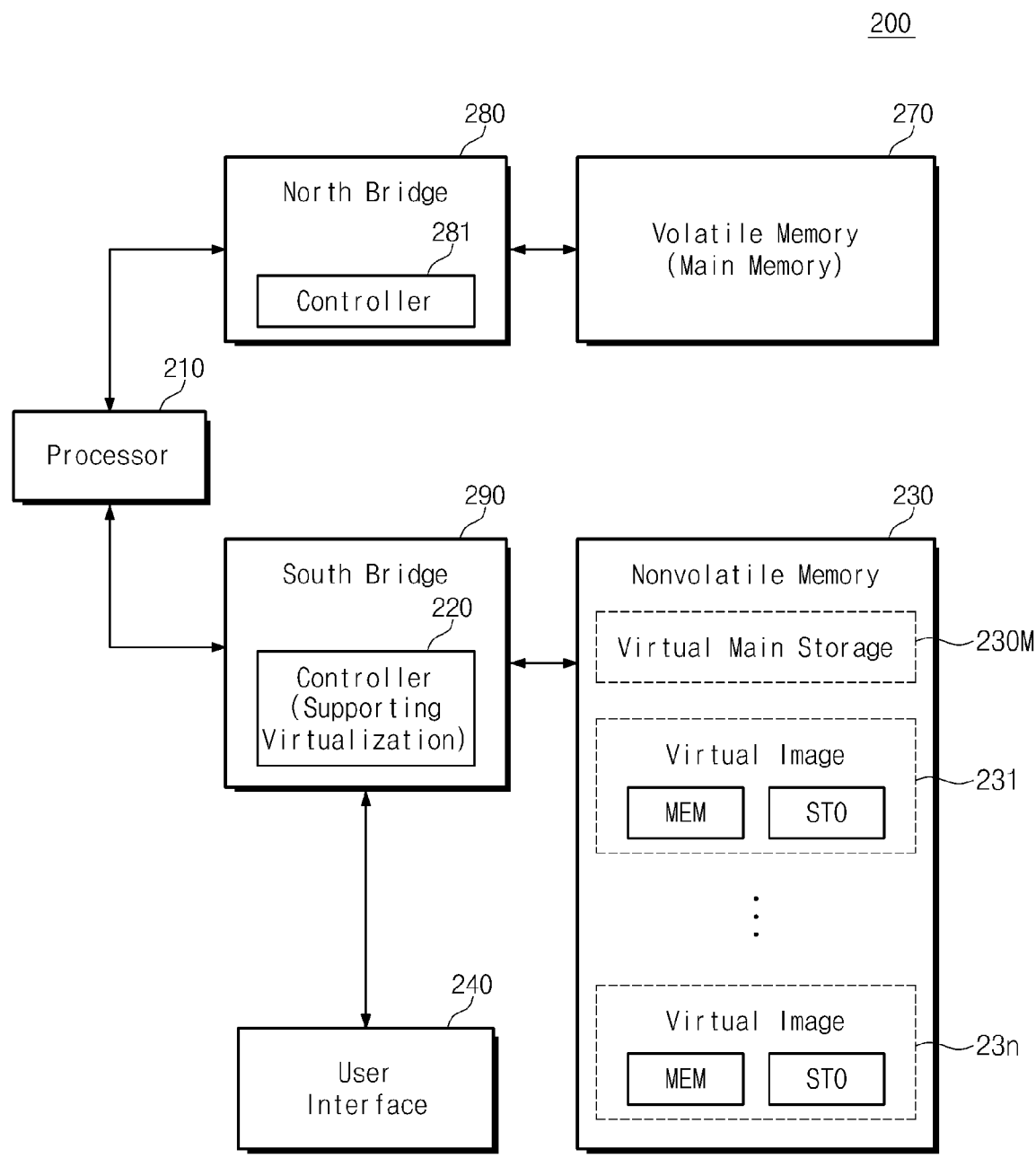
FIG. 5 is a block diagram schematically illustrating a computing device according to another exemplary embodiment.

FIG. 5 is a block diagram schematically illustrating a computing device according to another exemplary embodiment. Referring to FIG. 5, a computing device 200 may include a processor 210, a nonvolatile memory 230, a user interface 240, a volatile memory 270, a North Bridge 280, and a South Bridge 290.

The processor 210 may control an overall operation of the computing device 200, and may be configured to perform logical calculation.

The North Bridge 280 may operate responsive to a control of the processor 210. The North Bridge 280 may include, for example, a controller 281 to control the volatile memory 270 as a main memory. The nonvolatile memory 270 may include a DRAM.

The South Bridge 290 may operate responsive to a control of the processor 210. The South Bridge 290 may include, for example, a controller 220 to control the nonvolatile memory 230. As illustrated in FIG. 3, the controller 220 may include a memory controller 121, a storage controller 123, and a generic memory controller 125. The South Bridge 290 may control the user interface 240.

The nonvolatile memory 230 may include, for example, nonvolatile random access memories such as PRAM, MRAM, and so on. The nonvolatile memory 230 may include a virtual main storage 230M and a plurality of virtual images 231 to 23n assigned to the processor 210. Each of the virtual images 231 to 23n may include a virtual memory MEM and a virtual storage STO.

A main device of the computing device 200 may use the volatile memory 270 as a main memory and the virtual main storage 230M as a main storage. The main device of the computing device 200 may be a non-virtual device, not a virtual device. The computing device 200 may drive a plurality of virtual devices based on the plurality of virtual images 231 to 23n.

The South Bridge 290 may be additionally connected with separate storages such as a hard disk drive, a solid state drive, and so on. In one embodiment, an image of processes to drive the plurality of virtual images 231 to 23n may be stored at a separate storage connected with the nonvolatile memory 230 or the South Bridge 290.

Figure 6:
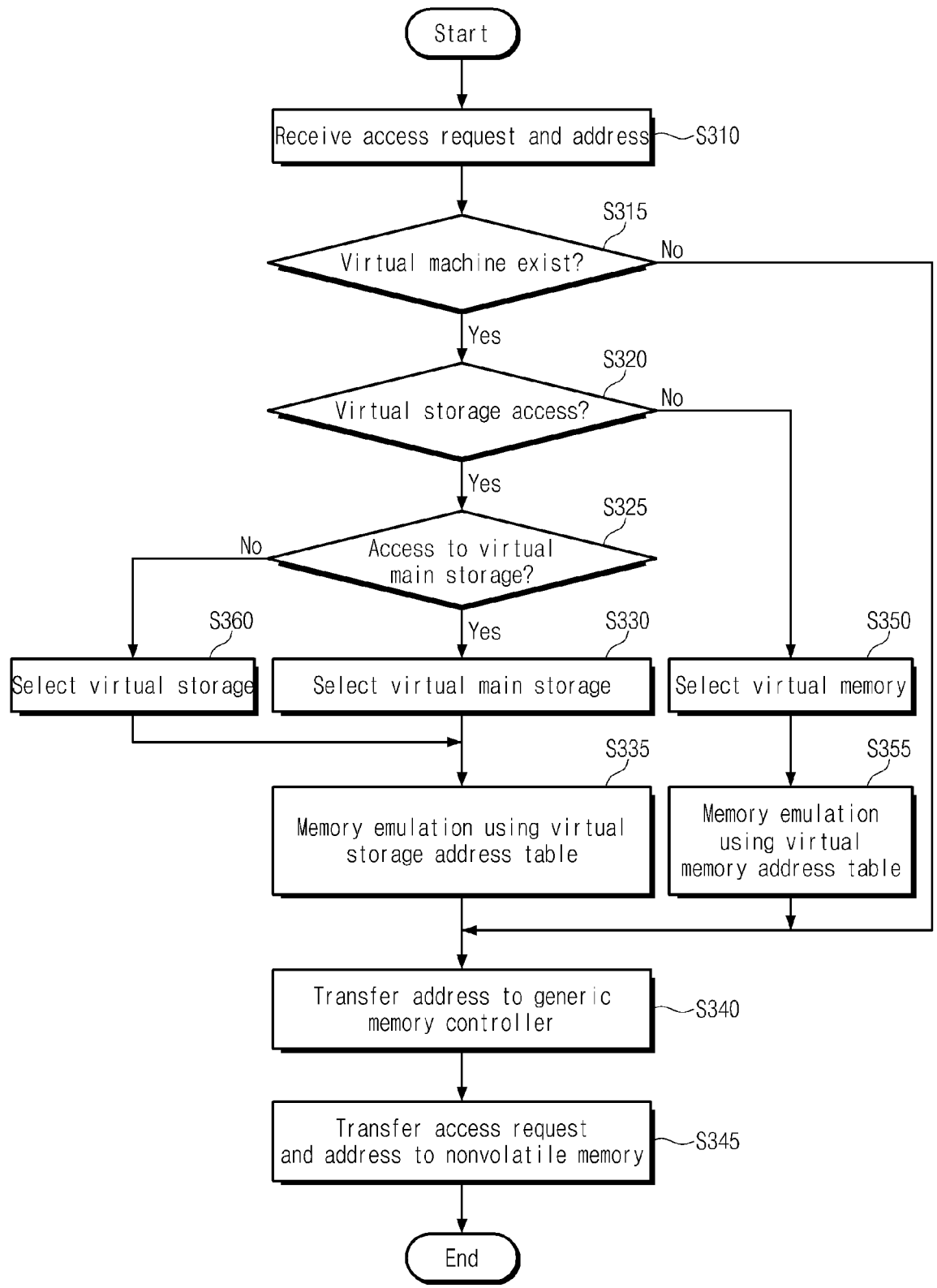
FIG. 6 is a flow chart illustrating a method in which a controller of FIG. 5 accesses a nonvolatile memory, according to an exemplary embodiment.

FIG. 6 is a flow chart illustrating a method in which a controller of FIG. 5 accesses a nonvolatile memory, according to one exemplary embodiment. A number of steps, also described as operations, are shown in FIG. 6. Referring to FIGS. 5 and 6, in operation S310, a controller 230 may receive an access request and an address. For example, the controller 230 may receive an access request and an address from processes which are driven by the processor 210 and control virtual images 231 to 23n. At this time, the received addresses may be virtual addresses of virtual memories MEM or virtual storages STO. For example, the controller 230 may receive the access request and the addresses from a main process to drive a main device. At this time, the received addresses may be addresses of a virtual main storage 230M.

In operation S315, whether a virtual device exists may be determined. For example, the controller 230 may determine whether a virtual device driven by the computing device 200 exists. If a virtual device exists, the method proceeds to operation S320.

In operation S320, whether the access request is an access request on a virtual storage may be determined. If the access request is an access request on a virtual storage, the method proceeds to operation S325.

In operation S325, whether the access request is an access request on a virtual main storage 270M may be determined. If the access request is an access request on a virtual main storage 270M, in operation S330, the virtual main storage 270M may be selected. If the access request is not an access request on a virtual main storage 270M, in operation S360, a virtual storage may be selected.

In operation S335, memory emulation may be executed using a virtual storage address table. A virtual storage controller 123 (refer to FIG. 3) may convert the received address into an address of the nonvolatile memory 230 using a virtual storage address table corresponding to a selected virtual storage or the virtual main storage 270M.

In operation S340, the converted address may be transferred to a generic memory controller 125 (refer to FIG. 3). A storage controller 123 may send the converted address to the generic controller 125.

In operation S345, the access request and the converted address may be transferred to the nonvolatile memory 230. The generic controller 125 may send the access request and the converted address to the nonvolatile memory 230.

If the access request is determined not to be an access request on a virtual storage in operation S320, (e.g., the access request is determined to be an access request on a virtual memory), the method proceeds to operation S350. In operation S350, a virtual image may be selected. In operation S355, memory emulation may be executed using a virtual memory address table. A virtual memory controller 121 (refer to FIG. 3) may convert the received address into an address of the nonvolatile memory 230 using a virtual memory table of the selected virtual memory. In operation S340, the converted address may be transferred to the generic memory controller 125. In operation S345, the access request and the converted address may be sent to the nonvolatile memory 230.

Returning to operation S315, if a virtual memory does not exist, the method proceeds to operation S340, in which an address is sent to the generic memory controller 125. In operation S345, the access request and the address may be sent to the nonvolatile memory 230.

Figure 7:
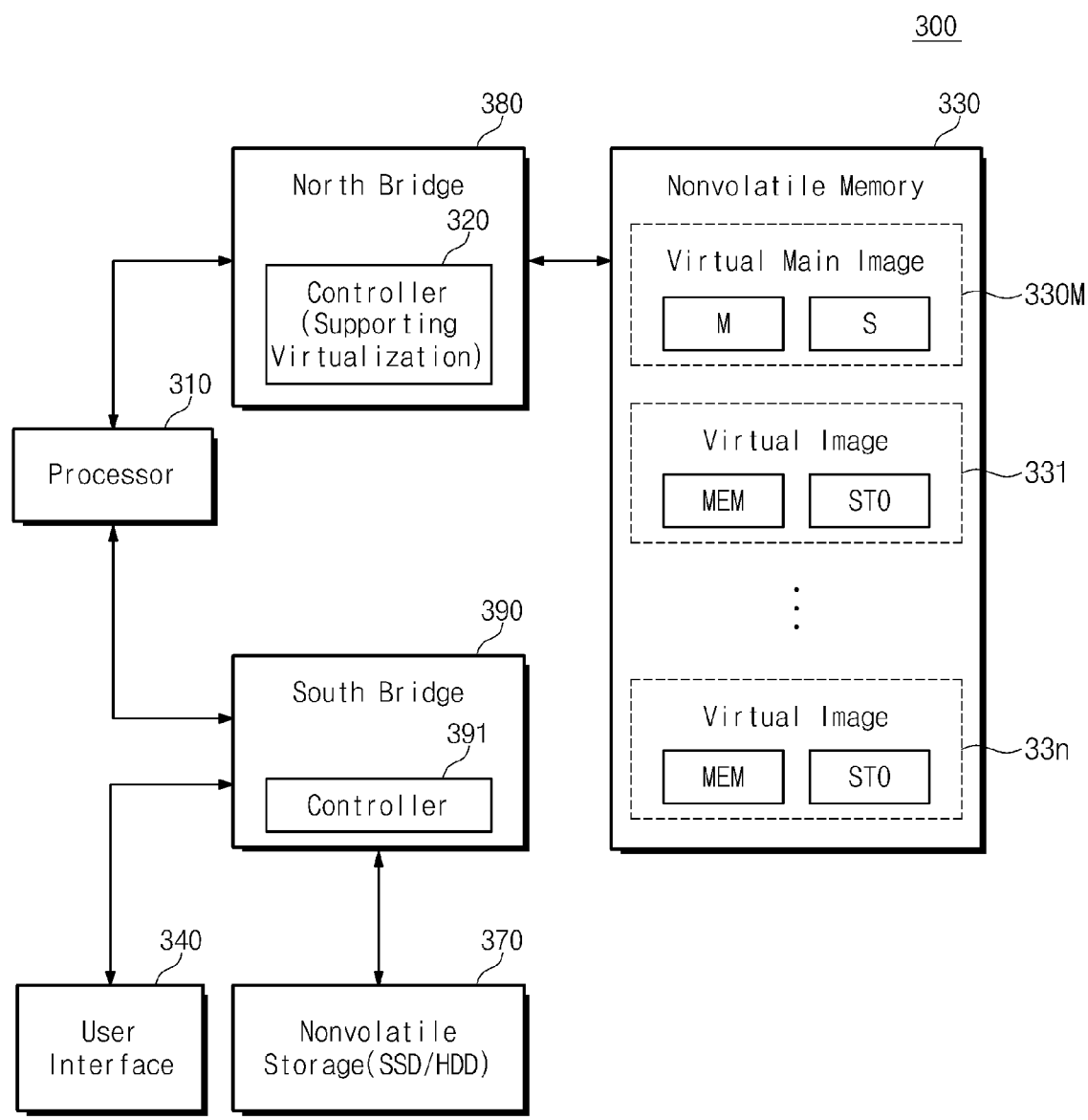
FIG. 7 is a block diagram schematically illustrating a computing device according to still another exemplary embodiment.

FIG. 7 is a block diagram schematically illustrating a computing device according to still another exemplary embodiment. Referring to FIG. 7, a computing device 300 may comprise a processor 310, a nonvolatile memory 330, a user interface 340, a nonvolatile storage 370, a North Bridge 380, and a South Bridge 390.

The processor 310 may control an overall operation of the computing device 300, and may be configured to perform logical calculation.

The North Bridge 380 may operate responsive to a control of the processor 310. The North Bridge 380 may include a controller 320 to control the nonvolatile memory 330. As illustrated in FIG. 3, the controller 320 may include a memory controller 121, a storage controller 123, and a generic memory controller 125.

The nonvolatile memory 330 may include, for example, nonvolatile random access memories such as PRAM, MRAM, and so on. The nonvolatile memory 330 may include a virtual main image 330M and a plurality of virtual images 331 to 33$n$ assigned to the processor 310. The virtual main image 330M may include a virtual memory M and a virtual main storage S. Each of the virtual images 331 to 33$n$ may include a virtual memory MEM and a virtual storage STO.

The South Bridge 390 may operate responsive to a control of the processor 310. The South Bridge 390 may include a controller 391 to control a nonvolatile storage 370. The South Bridge 390 may control the user interface 340 and the nonvolatile storage 370. The nonvolatile storage 370 may be a hard disk drive, a solid state drive, and so on.

A main device of the computing device 300 may be driven using the virtual main image 330M. The main device may use the virtual main memory M of the virtual main image 330M as a main memory and the virtual main storage S as a main storage.

The computing device 300 may drive a plurality of virtual devices based on a plurality of virtual images 331 to 33$n$. In one embodiment, an image of processes to drive the virtual main image 330M and the plurality of virtual images 331 to 33$n$ may be stored at the nonvolatile memory 330 or the nonvolatile storage 370.

Figure 8:
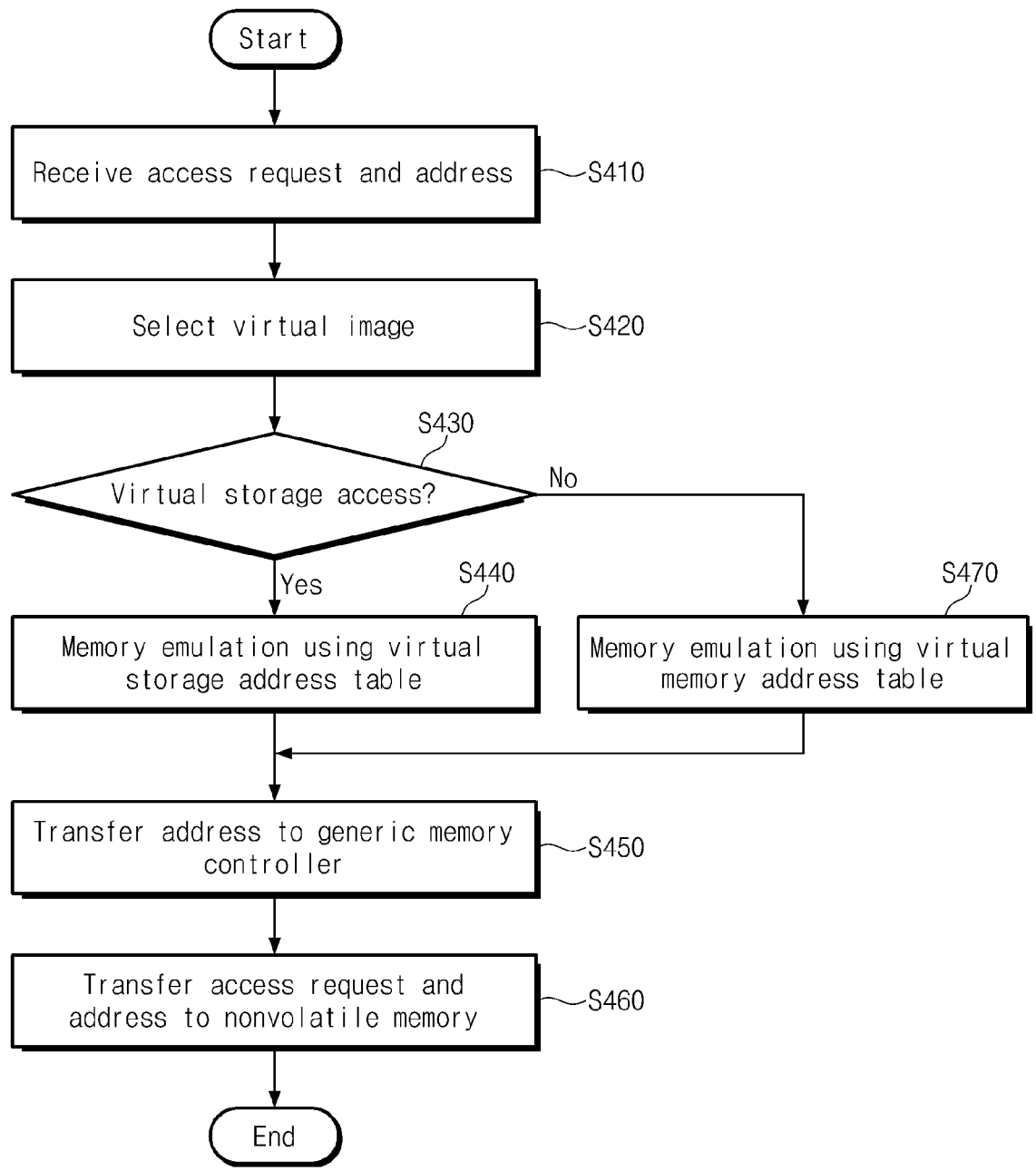
FIG. 8 is a flow chart illustrating a method in which a controller of FIG. 7 accesses a nonvolatile memory, according to one exemplary embodiment.

FIG. 8 is a flow chart illustrating a method in which a controller of FIG. 7 accesses a nonvolatile memory, according to one exemplary embodiment. A number of steps, also described as operations, are shown in FIG. 8. Referring to FIGS. 7 and 8, in operation S410, a controller 320 may receive an access request and an address of a nonvolatile memory 330.

In operation S420, a virtual image may be selected according to the access request and the address. For example, a virtual main image 330M or one of a plurality of virtual images 331 to 33$n$ may be selected.

In operation S430, whether the access request and the address are associated with an access to a virtual storage may be determined. If so, in operation S440, memory emulation may be executed using a virtual storage address table. The memory emulation may be executed by a virtual storage controller 123 (refer to FIG. 3). If not, in operation S470, memory emulation may be executed using a virtual memory address table. The memory emulation may be executed by a virtual memory controller 121 (refer to FIG. 3).

In operation S450, a converted address may be sent to a generic memory controller 125 (refer to FIG. 3). In operation S460, the access request and the address may be transferred to a nonvolatile memory 330.

Figure 9:
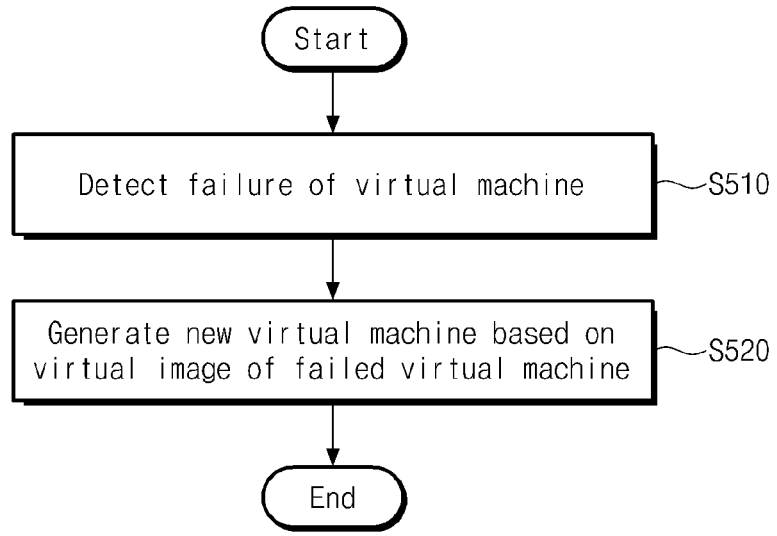
FIG. 9 is a flow chart illustrating a virtual device fail recovery method according to an exemplary embodiment.

FIG. 9 is a flow chart illustrating a virtual device fail recovery method according to an exemplary embodiment. Referring to FIG. 9, in operation S510, a fail of a virtual device may be detected. The failure may be caused by, for example, a failure or error in the process performing a program or task using the virtual device. In operation S520, a new virtual device may be produced based on a virtual image of the failed virtual device.

According to an embodiment, both a virtual memory and a virtual storage may be generated at a nonvolatile memory. Although a virtual device is failed, the nonvolatile memory may retain data which the failed virtual device stores at a virtual storage and data being processed at the virtual memory. Thus, the failed virtual device may be recovered simply by generating a new virtual device including a virtual image of the failed virtual device.

Figure 10:
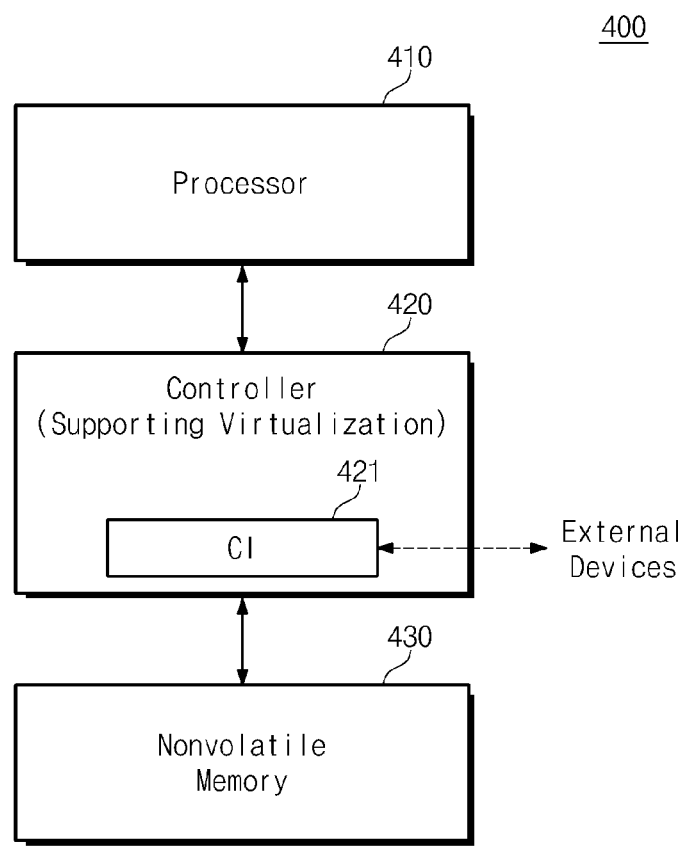
FIG. 10 is a block diagram schematically illustrating a computing device according to still another exemplary embodiment.

FIG. 10 is a block diagram schematically illustrating a computing device according to still another exemplary embodiment. Referring to FIG. 10, a computing device 400 may include a processor 410, a controller 420, and a nonvolatile memory 430.

In comparison with a computing device 100 of FIG. 1, the controller 420 may include a communication interface 421. For a simple description, a description of the user interface 140 for computing device 400 is skipped.

The computing device 400 may communicate with an external device via the communication interface 421. The communication interface 421 may include, for example, an Ethernet interface, a WiFi interface, a Bluetooth interface, a Long Term Evolution (LTE) interface, a WiMax interface, and so on. The communication interface 421 may communicate with the external device, for example, via an optical, wire, or wireless communication manner.

Figure 11:
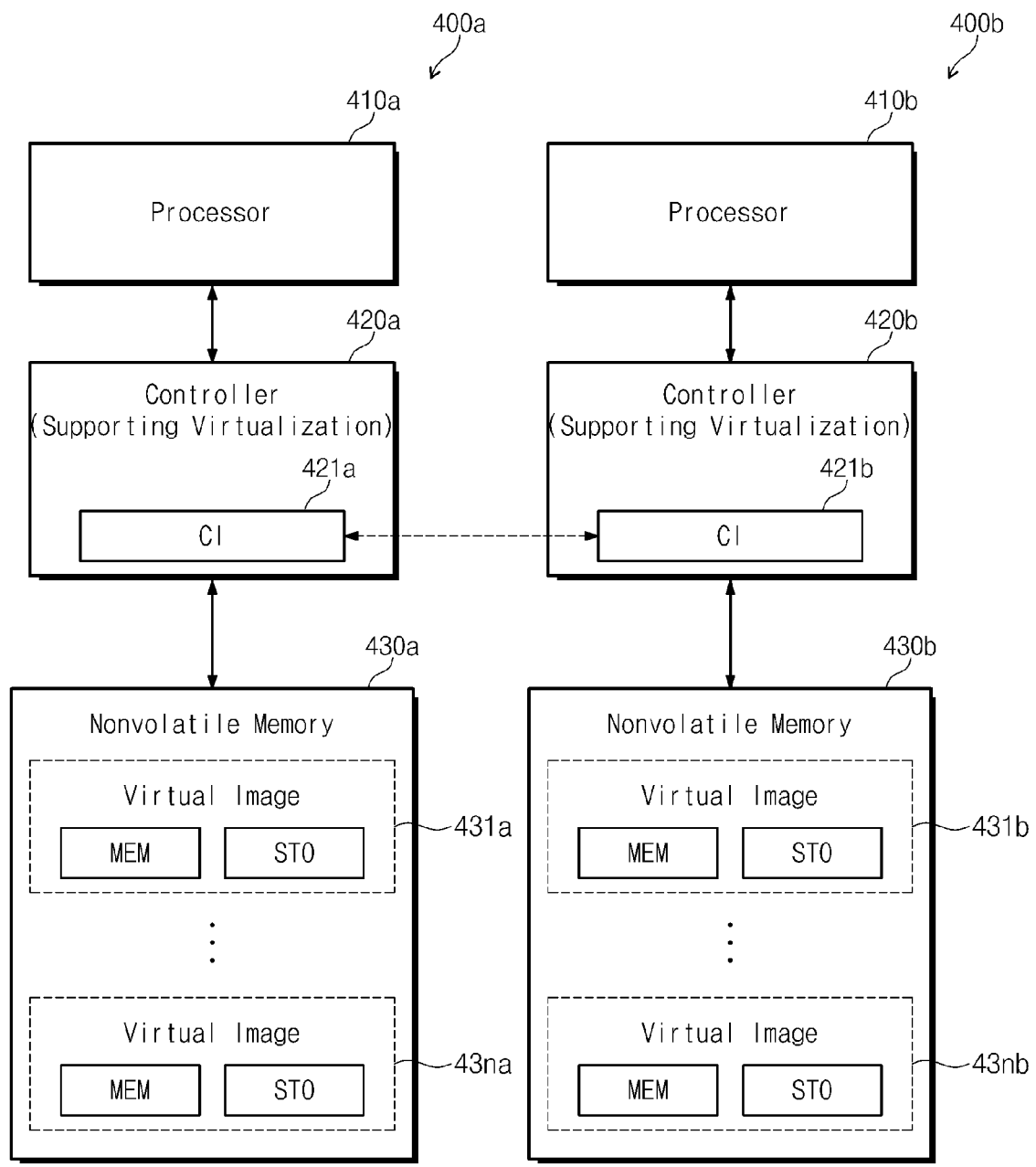
FIG. 11 is a diagram illustrating a method in which computing devices of FIG. 10 communicate with one another via communication interfaces, according to an exemplary embodiment.

FIG. 11 is a diagram illustrating a method in which computing devices of FIG. 10 communicate with one another via communication interfaces, according to one exemplary embodiment. Referring to FIG. 11, a computing device 400a may include a processor 410a, a controller 420a, and a nonvolatile memory 430a. A computing device 400b may include a processor 410b, a controller 420b, and a nonvolatile memory 430b.

The computing device 400a may be configured to drive a plurality of virtual devices based on a plurality of virtual images 431a to 43na. The computing device 400b may be configured to drive a plurality of virtual devices based on a plurality of virtual images 431b to 43nb.

The computing devices 400a and 400b may communicate with each other via communication interfaces 421a and 421b.

Figure 12:
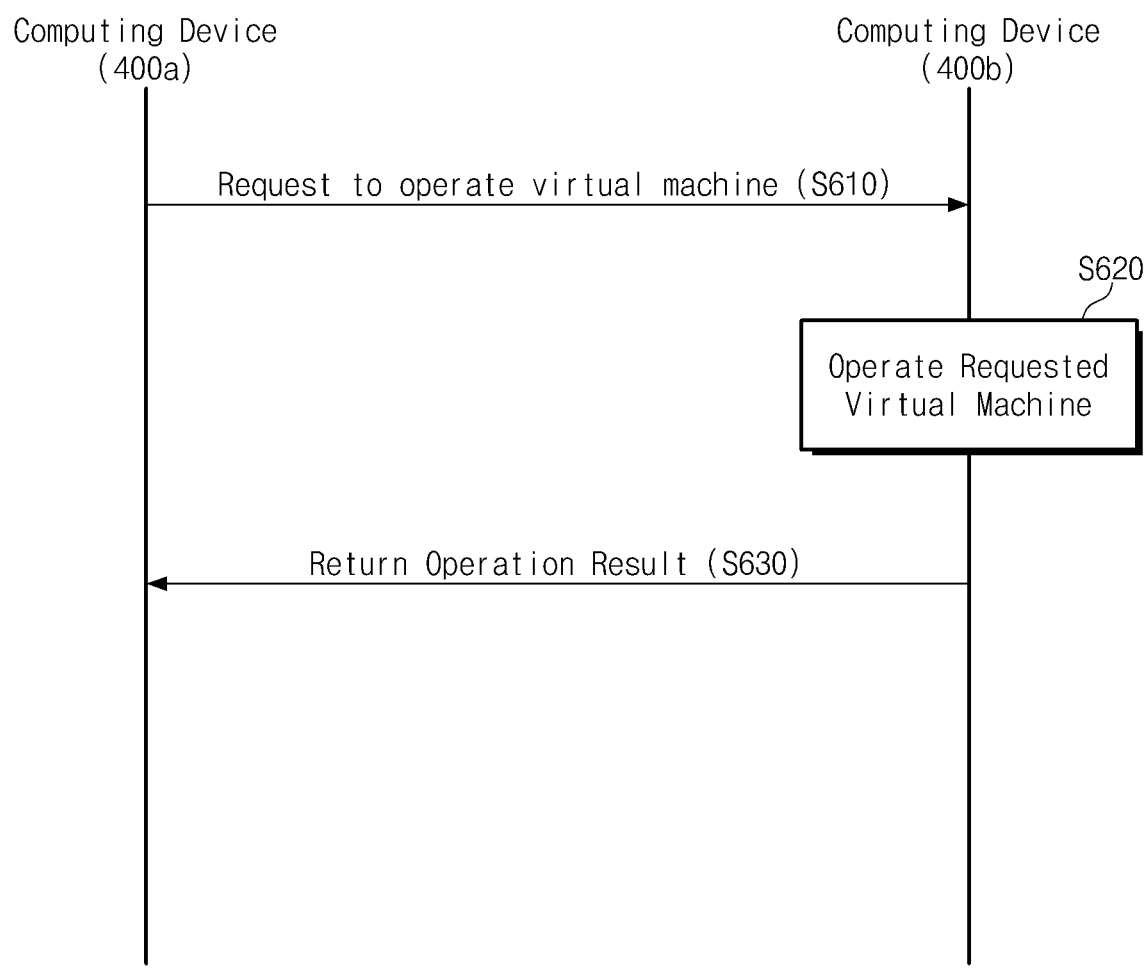
FIG. 12 is a flow chart illustrating an exemplary method in which computing devices of FIG. 11 control virtual devices via communication interfaces, according to one embodiment.

FIG. 12 is a flow chart illustrating an exemplary method in which computing devices of FIG. 11 control virtual devices via communication interfaces, according to one exemplary embodiment. Referring to FIGS. 11 and 12, in operation S610, a computing device 400a may send a virtual device driving request to a computing device 400b via communication interfaces 421a and 421b.

In operation S620, the computing device 400b may select one or more virtual devices of a plurality of virtual devices 431b to 43nb according to the virtual device driving request, and may drive the selected virtual devices.

In operation S630, the computing device 400b may send a driving result of the virtual devices to the computing device 400a.

Accordingly, the computing devices 400a and 400b may control virtual devices driven at a remote computing device via the communication devices 421a and 421b.

Figure 13:
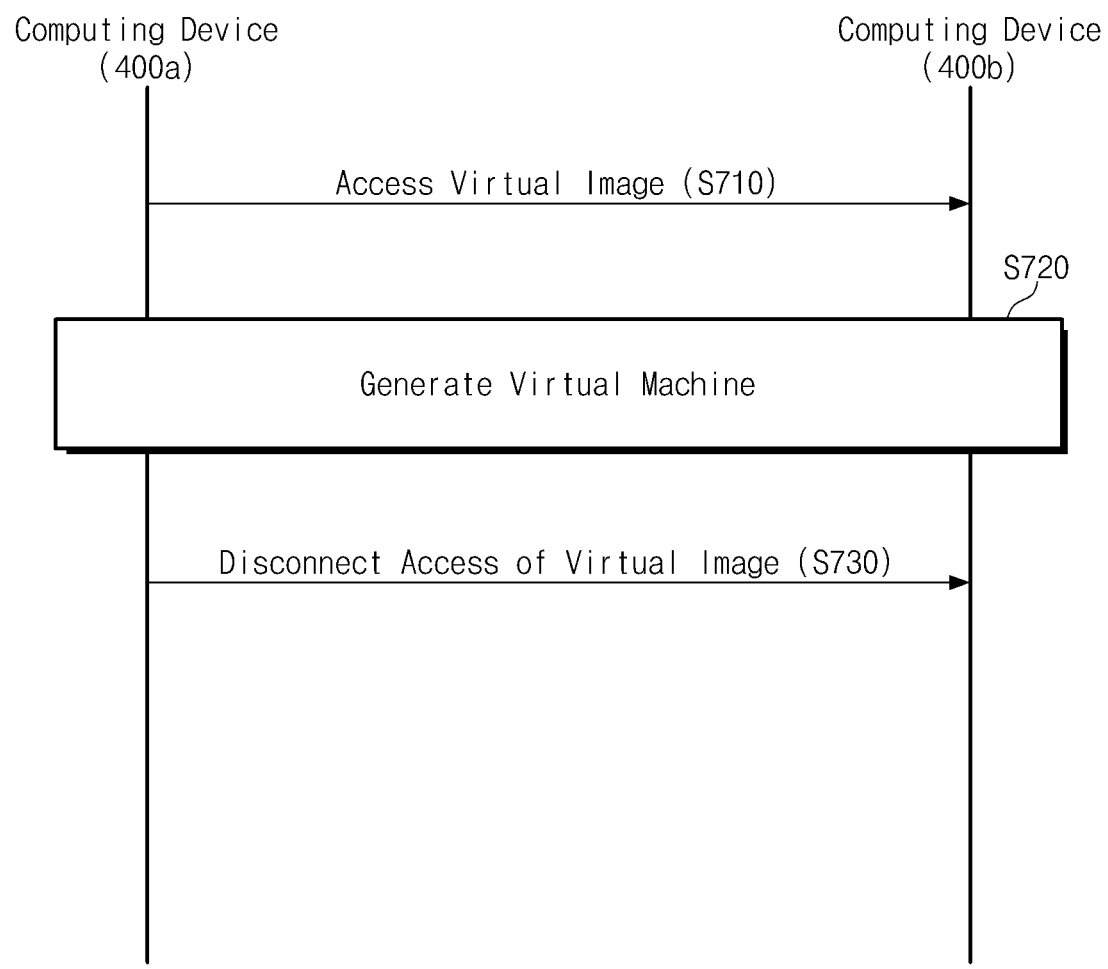
FIG. 13 is a flow chart illustrating another exemplary method in which computing devices of FIG. 11 control virtual devices via communication interfaces, according to one embodiment.

FIG. 13 is a flow chart illustrating another exemplary method in which computing devices of FIG. 11 control virtual devices via communication interfaces, according to one exemplary embodiment. Referring to FIG. 13, in operation S710, a computing device 400a may access a virtual image of a computing device 400b via communication interfaces 421a and 421b.

In operation S720, the computing device 400a may generate a virtual device based on a virtual image of the accessed computing device 400b. The computing device 400a may control the generated virtual device according to a method described with reference to FIG. 6 or 8. For example, the generated virtual device may be accessed according to a method described with reference to FIG. 6 or 8 except that an access request and an address output from a generic memory controller 125 of a controller 220 or 320 are transferred to a nonvolatile memory 430b of a remote computing device 400b via communication interfaces 421a and 421b.

In operation S730, if an access of the virtual device is completed, an access of the virtual image may be disconnected and the virtual device may be ended.

As a result, in one embodiment, although a processor 410b of the remote computing device 400b is at an unusable state or is not powered, the computing device 400a may generate and access a virtual device using a virtual image of the remote computing device 400b under a condition that a controller 420b and a nonvolatile memory 430b are powered. Data of a virtual device changed by the computing device 400a may be retained at a nonvolatile memory 430b. Thus, when the computing device 400b produces a virtual device using a corresponding virtual image, data continuity of the virtual device may be secured.

Figure 14:
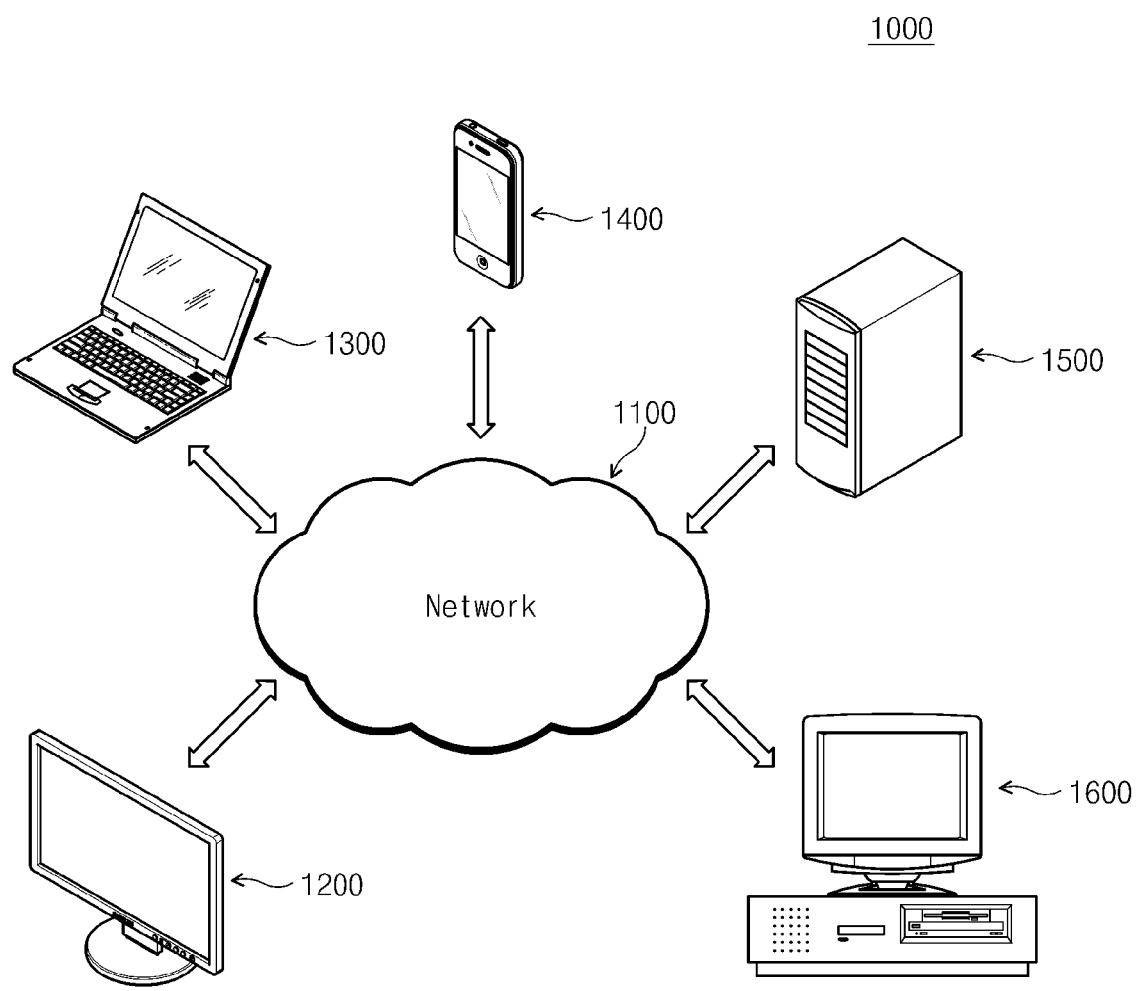
FIG. 14 is a conceptual diagram illustrating a cloud system according to an exemplary embodiment.

FIG. 14 is a conceptual diagram illustrating a cloud system according to an exemplary embodiment. Referring to FIG. 14, a cloud system 1000 may include a network and computing devices 1200 to 1500.

The computing devices 1200 to 1500 may communicate with one another via the network 1100. The computing devices 1200 to 1500 may include, for example, a server, a computer, a notebook computer, a terminal, a smartphone, a smart pad, and so on. The computing devices 1200 to 1500 may assign a virtual image including virtual memories and virtual storages to a nonvolatile memory.

In one embodiment, each of the computing devices 1200 to 1500 may assign virtual images. The computing devices 1200 to 1500 may drive virtual devices using assigned virtual images. The computing devices 1200 to 1500 may access a virtual image of a remote computing device via the network 1100, and may generate a virtual device based on the accessed virtual image.

Since data of a virtual image is stored at a nonvolatile memory, it may be retained even at power-off. Thus, although data of a virtual image is changed by a remote computer, data continuity may be secured. The computing devices 1200 to 1500 may request virtual device driving via the network 1100 or generate a virtual device (refer to FIG. 13).

While this disclosure has been described with reference to exemplary embodiments, it will be apparent to those skilled in the art that various changes and modifications may be made without departing from the spirit and scope of the disclosed embodiments. Therefore, it should be understood that the above embodiments are not limiting, but illustrative.

What is claimed is:

1. A method of implementing a virtual device, the method including:
    generating a first virtual device comprising:
        assigning a first portion of a nonvolatile memory to a virtual memory of the first virtual device; and
        assigning a second portion of the nonvolatile memory to a virtual storage of the first virtual device;
    generating a second virtual device comprising:
        assigning a third portion of the nonvolatile memory to a virtual memory of the second virtual device; and
        assigning a fourth portion of the nonvolatile memory to a virtual storage of the second virtual device,
    wherein the nonvolatile memory is a nonvolatile Random Access Memory (RAM), and wherein the method further comprises:
        executing a first operating system using the first virtual device; and
        executing a second operating system different from the first operating system using the second virtual device.

2. The method of claim 1, wherein the nonvolatile RAM is one of a magnetic RAM (MRAM) or a phase-change RAM (PRAM).

3. The method of claim 1, further comprising:
generating a virtual memory address table including information on a mapping relationship between a first set of addresses of the nonvolatile memory and a set of addresses of the virtual memories of the first and second virtual devices; and
generating a virtual storage address table including information on a mapping relationship between a second set of addresses of the nonvolatile memory and a set of addresses of the virtual storages of the first and second virtual devices.

4. The method of claim 1, further comprising:
detecting a fail of one of the first and second virtual devices; and
generating a new virtual device including a corresponding one of the virtual memories of the first and second virtual devices and a corresponding one of the virtual storages of the first and second virtual devices to recover the failed one.

5. A virtual device control method of a computing device which includes a nonvolatile memory, the method comprising:
receiving a virtualization request;
assigning a first part of the nonvolatile memory to a virtual memory;
assigning a second part of the nonvolatile memory to a virtual storage;
generating a virtual device including the assigned virtual memory and the virtual storage;
receiving a second virtualization request;
assigning a third part of the nonvolatile memory to a second virtual memory;
assigning a fourth part of the nonvolatile memory to a second virtual storage; and
generating a second virtual device including the assigned second virtual memory and the second virtual storage.

6. The virtual device control method of claim 5, wherein the nonvolatile memory is a magnetic RAM or a phase-change RAM.

7. The virtual device control method of claim 5, further comprising:
assigning a fifth part of the nonvolatile memory to a virtual main memory of the computing device;
assigning a sixth part of the nonvolatile memory to a virtual main storage of the computing device; and
generating a virtual main device including the assigned virtual main memory and the virtual main storage.

8. The virtual device control method of claim 5,
wherein the virtual device can be changed and deleted, and
wherein the generating, changing, and deleting of the virtual device is executed by a basic input/output system (BIOS) of the computing device.

9. The virtual device control method of claim 5, further comprising:
generating a virtual memory address table including information on a mapping relationship between a set of addresses of the nonvolatile memory and a set of addresses of the virtual memory; and
generating a virtual storage address table including information on a mapping relationship between a set of addresses of the nonvolatile memory and a set of addresses of the virtual storage.

10. The virtual device control method of claim 9, further comprising:
receiving an access request and an address;
when the received access request and the received address correspond to the virtual memory, converting the address into an address of the nonvolatile memory based on the virtual memory address table and, when the received access request and the received address correspond to the virtual storage, converting the address into an address of the nonvolatile memory based on the virtual storage address table; and
accessing the nonvolatile memory using the converted address.

11. The virtual device control method of claim 5, further comprising:
detecting a fail of the virtual device; and
generating a new virtual device including the virtual memory and the virtual storage to recover the failed virtual device.

12. The virtual device control method of claim 5, further comprising:
accessing a virtual memory and a virtual storage of a nonvolatile memory in an external computing device, which is external to the nonvolatile memory and external to the computing device; and
generating a virtual device including the virtual memory and the virtual storage of the nonvolatile memory in the external computing device.

13. A computing device, comprising:
a processor;
a nonvolatile memory, and
a controller configured to control the nonvolatile memory according to a control of the processor,
wherein the processor is configured to assign a virtual memory and a virtual storage on the nonvolatile memory via the controller and to generate and control a virtual device including the assigned virtual memory and virtual storage,
wherein the controller is further configured to assign a second virtual memory and a second virtual storage on the nonvolatile memory via the controller and to generate and control a second virtual device including the assigned second virtual memory and the second virtual storage.

14. The computing device of claim 13, wherein the controller comprises:
a virtual memory controller configured to convert an address of the assigned virtual memory generated by the processor into an address of the nonvolatile memory;
a virtual storage controller configured to convert an address of the assigned virtual storage generated by the processor into an address of the nonvolatile memory; and
a generic memory controller configured to access the nonvolatile memory using an address converted by the virtual memory controller or the virtual storage controller.

15. The computing device of claim 13, wherein the controller is included in a North Bridge of the computing device.

16. The computing device of claim 13, further comprising:
a random access memory configured to communicate with the processor via a North Bridge, the controller being included in a South Bridge of the computing device.

17. The computing device of claim 13, wherein the controller comprises a communication interface to communicate with an external computing device and the processor is configured to access a virtual memory and a virtual storage of the external computing device via the communication interface of the controller and to generate a virtual device including the virtual memory and the virtual storage of the external computing device, the external computing device being external to the computing device.

18. The computing device of claim 13, wherein the nonvolatile memory is a magnetic RAM or a phase-change RAM.

19. The computing device of claim 13, wherein the processor is configured to generate a new virtual device including the virtual memory and the virtual storage if a failure of the virtual device is detected.

* * * * *